US011336573B2

(12) United States Patent
Janakiraman et al.

(10) Patent No.: US 11,336,573 B2
(45) Date of Patent: May 17, 2022

(54) SERVICE CHAINING IN MULTI-FABRIC CLOUD NETWORKS

(71) Applicant: Cisco Technology, Inc., San Jose, CA (US)

(72) Inventors: Rajagopalan Janakiraman, Cupertino, CA (US); Sivakumar Ganapathy, Fremont, CA (US); Javed Asghar, Dublin, CA (US); Azeem Muhammad Suleman, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 24 days.

(21) Appl. No.: 16/801,500

(22) Filed: Feb. 26, 2020

(65) Prior Publication Data

US 2021/0266256 A1    Aug. 26, 2021

(51) Int. Cl.
| | |
|---|---|
| *G06F 15/16* | (2006.01) |
| *H04L 45/74* | (2022.01) |
| *H04L 43/16* | (2022.01) |
| *H04L 45/00* | (2022.01) |
| *H04L 49/20* | (2022.01) |
| *H04L 49/25* | (2022.01) |
| *H04L 61/5007* | (2022.01) |
| *H04L 67/1001* | (2022.01) |
| *G06F 9/455* | (2018.01) |

(52) U.S. Cl.
CPC .............. *H04L 45/74* (2013.01); *H04L 43/16* (2013.01); *H04L 45/70* (2013.01); *H04L 45/72* (2013.01); *H04L 49/20* (2013.01); *H04L 49/25* (2013.01); *H04L 61/2007* (2013.01); *H04L 67/1002* (2013.01); *G06F 2009/45595* (2013.01)

(58) Field of Classification Search
CPC . H04L 45/74; H04L 67/1002; H04L 61/2007; H04L 43/16; H04L 12/4641
USPC ........................................................ 370/392
See application file for complete search history.

(56) References Cited

U.S. PATENT DOCUMENTS

| | | |
|---|---|---|
| 6,711,152 B1 | 3/2004 | Kalmanek, Jr. et al. |
| 9,331,940 B2 | 5/2016 | Balus et al. |
| 9,537,748 B1 | 1/2017 | Durairaj et al. |
| 9,590,907 B2 | 3/2017 | Beliveau et al. |
| 9,634,922 B2 | 4/2017 | Yuksel et al. |
| 9,985,883 B2 * | 5/2018 | MeLampy ............ H04L 45/566 |

(Continued)

OTHER PUBLICATIONS

The PCT Search Report and Written Opinion dated Apr. 26, 2021 for PCT Application No. PCT/US21/16625, 14 pages.

*Primary Examiner* — Moustafa M Meky
*Assistant Examiner* — Thorne E Waugh
(74) *Attorney, Agent, or Firm* — Lee & Hayes, P.C.

(57) ABSTRACT

Techniques for routing data packets through service chains within and between public cloud networks of multi-cloud fabrics. A router in a network, e.g., a public cloud network, receives data packets from nodes in the network through segments of the network. Based at least in part on (i) a source address of the data packet, (ii) a destination address of the data packet, and (iii) an identity of the segments of the network from which the data packets are received, the router determines a next node in the network to which the data packet is to be forwarded. The router may then forward the data packet through another segment of the network to the next node and then receive the data packet from the next node through the another segment.

20 Claims, 6 Drawing Sheets

(56) References Cited

U.S. PATENT DOCUMENTS

| | | | | |
|---|---|---|---|---|
| 10,091,099 | B2* | 10/2018 | Menon | H04L 61/2514 |
| 10,355,989 | B1* | 7/2019 | Panchal | H04L 67/10 |
| 10,594,604 | B1* | 3/2020 | Lohiya | H04L 45/74 |
| 10,742,557 | B1* | 8/2020 | Miriyala | H04L 63/0263 |
| 10,911,360 | B2* | 2/2021 | Boutros | H04L 12/4633 |
| 10,931,478 | B2* | 2/2021 | Nunes | H04L 45/64 |
| 2015/0052525 | A1* | 2/2015 | Raghu | H04L 67/10 718/1 |
| 2016/0277446 | A1* | 9/2016 | Kumar | H04L 63/0823 |
| 2017/0019302 | A1* | 1/2017 | Lapiotis | H04L 41/145 |
| 2017/0214737 | A1* | 7/2017 | Agarwal | H04L 69/326 |
| 2017/0214738 | A1* | 7/2017 | Agarwal | H04L 47/125 |
| 2017/0237656 | A1* | 8/2017 | Gage | H04L 61/2521 370/392 |
| 2017/0346707 | A1* | 11/2017 | Menon | H04L 61/256 |
| 2017/0346709 | A1* | 11/2017 | Menon | H04L 43/0829 |
| 2017/0346726 | A1* | 11/2017 | Menon | H04L 45/28 |
| 2017/0346730 | A1* | 11/2017 | Menon | H04L 49/309 |
| 2017/0364844 | A1* | 12/2017 | Saraf | G06Q 10/0633 |
| 2018/0041425 | A1* | 2/2018 | Zhang | H04L 12/4645 |
| 2019/0007321 | A1* | 1/2019 | Fedyk | H04L 61/6022 |
| 2020/0014594 | A1* | 1/2020 | Lapiotis | H04L 67/22 |

\* cited by examiner

US 11,336,573 B2

SERVICE CHAINING IN MULTI-FABRIC CLOUD NETWORKS

TECHNICAL FIELD

The present disclosure relates generally to routing data packets through service chains within and between public cloud networks of multi-cloud fabrics.

BACKGROUND

With the continued increase in the proliferation and use of devices with Internet accessibility, the demand for Internet services and content has similarly continued to increase. The providers of the Internet services and content continue to scale the computing resources required to service the growing number of user requests without falling short of user-performance expectations. For instance, providers typically utilize large and complex datacenters to manage the network and content demands from users. The datacenters generally comprise server farms that host workloads that support the services and content, and further include network devices such as switches and routers to route traffic through the datacenters and enforce security policies.

Generally, these networks of datacenters are one of two types: private networks owned by entities such as enterprises or organizations (e.g., on-premises networks); and public cloud networks owned by cloud providers that offer computing resources for purchase by users. Often, enterprises will own, maintain, and operate on-premises networks of computing resources to provide Internet services and/or content for users or customers. However, as noted above, it can become difficult to satisfy the increasing demands for computing resources while maintaining acceptable performance for users. Accordingly, private entities often purchase or otherwise subscribe for use of computing resources and services from public cloud providers. For example, cloud providers can create virtual private clouds (also referred to herein as "private virtual networks") on the public cloud and connect the virtual private cloud or network to the on-premises network in order to grow the available computing resources and capabilities of the enterprise. Thus, enterprises can interconnect their private or on-premises network of datacenters with a remote, cloud-based datacenter hosted on a public cloud, and thereby extend their private network.

However, because on-premises networks and public cloud networks are generally developed and maintained by different entities, there is a lack of uniformity in the policy management and configuration parameters between the datacenters in the on-premises networks and public cloud networks. This lack of uniformity can significantly limit an enterprise's ability to integrate their on-premises networks with public cloud networks by, for example, being unable to apply consistent policies, configuration parameters, routing models, and so forth. Various entities have developed software-defined network (SDN) and datacenter management solutions that translate the intents of enterprise or organizations from their on-premises networks into their virtual private cloud networks for applications or services that are deployed across multi-cloud fabrics or environments. Accordingly, these multi-cloud SDN solutions must continually adapt for changes occurring within the on-premises networks and public cloud networks, while maintaining the business and user intents of the enterprises or organizations that supplement their on-premises networks with computing resources from the public cloud networks.

For example, enterprises that manage on-premises networks of datacenters often isolate and segment their on-premises networks to improve scalability, resiliency, and security in their on-premises networks. To satisfy the entities' desire for isolation and segmentation, the endpoints in the on-premises networks can be grouped into endpoint groupings (EPGs) using, for example, isolated virtual networks that can be used to containerize the endpoints to allow for applying individualized routing models, policy models, etc., across the endpoints in the EPGs. Generally, each subnet in an EPG or other virtual grouping of endpoints is associated with a range of addresses that can be defined in routing tables used to control the routing for the subnet. Due to the large number of routing tables implemented to route traffic through the on-premises networks, the entities managing the on-premises networks utilize virtual routing and forwarding (VRF) technology such that multiple instances of a VRF routing table are able to exist in a router and work simultaneously. Accordingly, subnets of EPGs in the on-premises networks of entities are associated with respective VRF routing tables and routers are able to store and utilize multiple instances of VRF routing tables simultaneously.

Services may be spun up and inserted into and/or between cloud networks. Examples of such services include, for example, firewall, application load balancers (ALBs), mirroring/analytic services, etc. Often, such services are deployed as a service chain insertion into cloud networks. Such service chains should support multiple nodes in a chain in a flexible manner. The services should be placeable within the chain in any order and the traffic may or may not be destined to internet protocol (IP) addresses hosted by any of these services in the chain. High availability should be provided for each service node in the service chain. Thus, each service node of the service chain should include multiple instances of the service. It is desirable to have specific flows, e.g., source to destination combinations, in order to have granular control. It is also desirable to replicate service chains across regions in order to cater to traffic in any part of the public cloud in a cost-effective fashion. Furthermore, based on traffic, it is desirable to be able to elastically scale service nodes in order to be able to provide adequate services to traffic through the service node. Currently, cloud providers themselves do not offer sophisticated policy redirection or routing to allow these previously described functions. Routing is destination based only and the context of the leg of the service chain that has already been traversed is not available in data packets traversing the service chain.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1A:
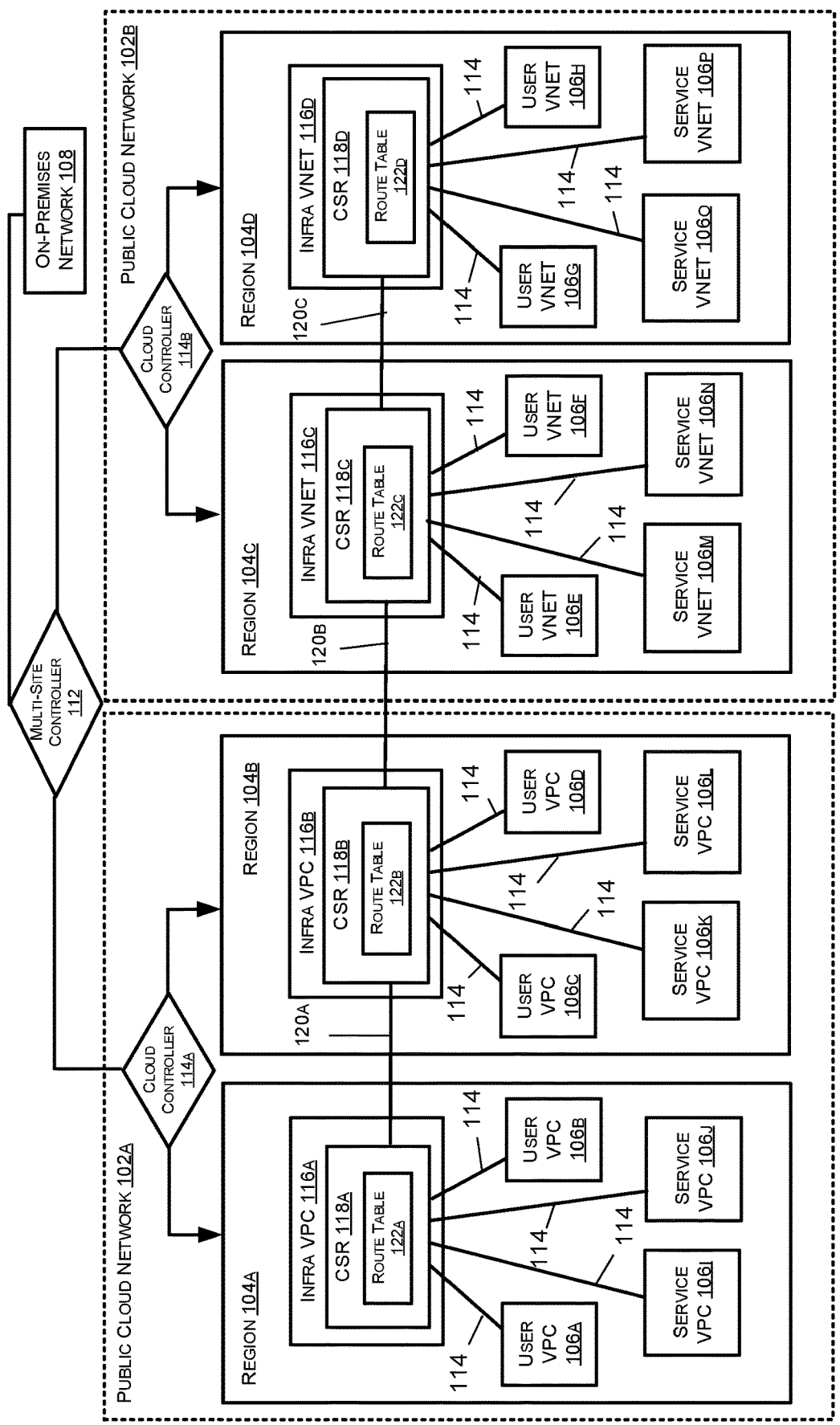
FIGS. 1A-1C schematically illustrate schematically illustrates a multi-cloud fabric that includes two public cloud networks.

This disclosure describes a method for routing data packets through service chains within and between public cloud networks of multi-cloud fabrics. The method may include a router in a network, e.g., a public cloud network, receiving, through a first segment of the network, a data packet from a first node in the network. Based at least in part on (i) a source address of the data packet, (ii) a destination address of the data packet, and (iii) an identity of the first segment of the network, the router determines a second node of the network to which the data packet is to be forwarded. Based at least in part on the determining, the router may forward the data packet through a second segment of the network to the second node. The router may receive the data packet from the second node through the second segment. Based at least in part on (i) the source address of the data packet, (ii) the destination address of the data packet, and (iii) an identity of the second segment of the network, the router may determine a third node in the network to which the data packet is to be forwarded. Based at least in part on the determining, the router may forward the data packet through a third segment of the network to the third node.

Additionally, the network may comprise multiple sub-networks, e.g., the network may be in the form of a multi-cloud network including multiple public cloud networks and/or multiple regions or zones of a public cloud network. Thus, the router may be a first router and part of a first sub-network, and the method may further comprise the first router receiving, through the second segment, the data packet from the second node. Based at least in part on (i) the source address of the data packet, (ii) the destination address of the data packet, and (iii) the identity of the second segment of the network, the first router may determine a third node in the network to which the data packet is to be forwarded, the third node comprising a service. The first router may receive, from one or more routers in one or more sub-networks of the multiple sub-networks, an any IP address for other nodes in the one or more sub-networks that comprise the service. The router may select a fourth node in a second sub-network of the one or more sub-networks, where the fourth node comprises the service. The first router may forward the data packet through a third segment of the network to a second router in the second sub-network. The second router may forward the data packet through a fourth segment of the second sub-network to the fourth node. The second router may receive the data packet from the fourth node through the fourth segment. The second router may determine a next destination to which the data packet is to be forwarded. The second router may forward the data packet to the next destination.

Additionally, the techniques described herein may be performed by a system and/or device having non-transitory computer-readable media storing computer-executable instructions that, when executed by one or more processors, performs the method described above.

EXAMPLE EMBODIMENTS

As noted above, enterprises and other organizations may own, maintain, and operate on-premises networks of computing resources for users or customers, and also for supporting internal computing requirements for running their organizations. However, due to the difficulties in satisfying the increasing demands for computing resources while maintaining acceptable performance for users, these enterprises may otherwise subscribe for use of computing resources and services from public cloud providers. For example, cloud providers can create virtual private clouds (also referred to herein as "private virtual networks") on the public cloud and connect the virtual private cloud or network to the on-premises network in order to grow the available computing resources and capabilities of the enterprise. Thus, enterprises can interconnect their private or on-premises network of datacenters with a remote, cloud-based datacenter hosted on a public cloud, and thereby extend their private network.

However, the lack of uniformity between on-premises networks and public cloud networks across various dimensions, such as policy management, configuration parameters, etc., may significantly limit an enterprise's ability to integrate their on-premises networks with public cloud networks by, for example, being unable to apply consistent policies, configuration parameters, routing models, and so forth. Various SDN solutions have been developed to translate the intents of enterprises or organizations from their on-premises networks into their virtual private cloud networks for applications or services that are deployed across multi-cloud fabrics or environments. For example, Cisco's software-defined network and datacenter management solution, the Application-Centric Infrastructure (ACI), provides a comprehensive solution for automated network connectivity, consistent policy management, and simplified operations for multi-cloud environments. The Cisco Cloud ACI solution allows enterprises to extend their on-premises networks into various public clouds, such as Amazon Web Services (AWS), Google Cloud, Microsoft Azure, and so forth. The Cisco Cloud ACI solution provides an architectural approach for interconnecting and managing multiple regions and/or sites, such as by defining inter-cloud policies, providing a scalable architecture with full fault-domain isolation and change-domain isolation, and ensuring that issues cannot cascade and bring down the entire distributed environment.

Various difficulties arise for SDN solutions such as Cisco Cloud ACI when attempting to interconnect on-premises networks of datacenters with public cloud networks of datacenters. For example, cloud providers may impose different restrictions on networking configurations and policies, routing and policy models, and/or other restrictions for their public clouds. These restrictions may be different than the restrictions or permissions implemented by enterprises who have developed their on-premises networks of datacenters. However, to interconnect on-premises networks with public cloud networks, SDN solutions in the multi-cloud fabric space often have to reconcile those differences to seamlessly scale the on-premises networks across the public cloud networks.

As an example, VPCs (virtual private clouds in AWS) or VNets (virtual networks in Microsoft Azure) in a public cloud network generally need to connect to routers in order to route traffic between the endpoints in the VPCs or VNets of the public cloud network and endpoints or other devices in the on-premises network. SDN solutions attempt to automate this connectivity between the on-premises networks and public cloud networks, such as by using solutions offered by providers of the public cloud networks. As an example, AWS provides a Transit Gateway (TGW) for use in automating this connectivity. Generally, the TGW, or just gateway, comprises a distributed router that connects to multiple VPCs. Rather than establishing VPN connections from each VPC to the router, the gateway is able to connect multiple VPCs to a single gateway, and also their on-premises networks to the single gateway. Attaching VPNs to each VPC is a cumbersome and costly task, and the transit gateway provides a single connection from on-premises networks to reach multiple VPCs in the AWS public cloud with relatively high bandwidth compared to VPN connections While these gateways are advantageous for various reasons, the different restrictions imposed for using these gateways surface issues for SDN controllers to solve when automating interconnectivity across a multi-cloud fabric. As an example, the gateways may require that each VPC connected to a particular gateway do not have overlapping subnets. Stated otherwise, all of the VPCs connected to a given gateway may be required to have unique address spaces or ranges (e.g., classless inter-domain routing (CIDR) blocks) that do not overlap. However, enterprises that manage on-premises networks often define address ranges, such as VRFs, that have overlapping address spaces (e.g., overlapping prefixes). In fact, that is one of the advantages of VRFs is to allow for overlapping subnets while providing segmentation and isolation for network paths.

One of the infrastructure blocks in a cloud networking/transit solution, e.g., Cisco Cloud ACI, is a cloud router that performs fine-grained routing between VPCs/VNets, or between VPCs/VNets and an on-premises network. The term VPC is used herein for describing examples but it should be understood that depending on the public cloud network, VNets may actually be used in place of VPCs and thus, the use of the term VPC is not meant to be limiting.

In configurations, a distributed cloud router may be provided for use as the networking block that connects source VPCs and destination VPCs of a data packet, as well as services provided within VPCs, e.g., a service chain between the source VPC and the destination VPC. The distributed cloud router may span multiple regions of public cloud networks and may be across multiple public cloud networks (e.g., AWS cloud networks and Microsoft Azure public cloud networks). Each instance of the cloud router may run or operate within one infra VPC within a region.

In configurations, data packet traffic (referred to herein as "traffic") may be routed between VPCs through tunnels running between user VPCs (e.g., source VPCs and destination VPCs) and infra VPCs. Similarly, traffic between any two networks (cloud-to-cloud or cloud-to-on-premises) may also be routed via tunnels. Additionally, in configurations, traffic may be routed from one infra VPC to another infra VPC through tunnels. For example, internet protocol security (IPSec)/generic routing encapsulation (GRE) tunnels may span between two CSR instances across regions.

In configurations, different tunnels are provided within each CSR (cloud router) to represent different legs/combinations (e.g., segments) of the service chain. Thus, based on the ingress tunnel interface of the data packet in the CSR, the previous node traversed in the service chain may be inferred and therefore the data packet may be guided toward the next service node in the service chain. Thus, the same data packet may traverse through the same CSR multiple times. Each time the data packet may be forwarded to a different service node in the service chain without changing any part of the original data packet (e.g., source IP address and destination IP address).

For example, assume a service chain includes service node A and service node B (e.g., service A VPC and service B VPC) in the service chain. A tunnel is created in the CSR for each of the service nodes. For example, tunnel one may be between a source user VPC and the CSR (thus no previous service). Tunnel two may extend between service node A and the CSR, e.g., the previous service is service A. Tunnel three may extend between service node B and the CSR, e.g., the previous service is service B. In configurations, the determination as to the previous service is made when the data packet returns from the service towards the CSR. Tunnel four may extend between the CSR and a destination user VPC, e.g., no further services are to be performed before delivery to the destination VPC. Each of the tunnels may be in different VRFs so that a current leg may be identified as a segment (or VRF) in the CSR. This may help in customizing a forwarding look-up table, route table, for the same pair of source and destination IP addresses of data packets (e.g., source IP address and destination IP address combinations) that is hopping through the same CSR to get to different services without any changes to data packet address information. Alternatively, all tunnels in the CSR may belong to the same VRF, but policy-based routing (PBR) rules may be different based on (tunnel, source, destination), combinations.

Thus, a route table may be defined at the CSR that provides rules for data packets from first user VPC (source) and second user VPC (destination) combinations. For example, based on a first source VPC and destination VPC combination, the CSR knows to route data packets through a service chain that includes services A and B enroute to the destination VPC, while based on a second source VPC and destination VPC combination, the CSR knows to route data packets through a service chain that include services A, B, and C enroute to the destination VPC. Any number of services may be included in the service chain.

Thus, for example, based on the first source VPC and destination VPC combination, a data packet received by the CSR via tunnel one from the source VPC may be routed to the service A node using tunnel two. After the service A is performed, the data packet may be routed back to the CSR via tunnel two. Since the CSR receives the data packet via tunnel two, based on the route table, e.g., the source VPC and the destination VPC, the CSR routes the data packet on tunnel three to the service B node. After service B is performed, the data packet is routed back to the CSR via tunnel three. Based on the route table, the CSR knows to now route the data packet via tunnel four to the destination user VPC since no services are left to be performed.

In configurations, multiple regions of a public cloud network may each have the same service VPCs, which may also include multiple instances that provide the services. For example, a first public cloud network region and a second public cloud network region may each have a service A VPC. The service A VPC of both regions may carry the same anycast IP address. The CSR of the regions may advertise this anycast IP address to other CSRs and other regions through border gateway protocol (BGP). The anycast IP of the service node is the PBR rule destination. When multiple cloud router CSRs advertise the anycast IP in the regions of the public cloud network(s), in configurations the service VPC that is closest to the CSR receiving the broadcast may be chosen. Generally, if the service A VPC of the same region of the CSR receiving the broadcast is functioning, then that service A VPC is chosen, e.g., the locally attached VPC in the same zone/region of the receiving CSR. However, if the service VPC has failed or is overloaded, the anycast IP address of a service A VPC of an adjacent region (or adjacent zone) may automatically be chosen.

Thus, the data packet may be routed via a tunnel from a first CSR (the receiving CSR) to a second CSR (CSR of the adjacent region). The second CSR may then route the data packet along the appropriate tunnel in the corresponding region to the service A VPC. When the service is completed, the data packet may be routed back to the second CSR, which may forward the data packet back to the first CSR, which may then continue moving the data packet through the service chain and on to the destination user VPC. In configurations, the second CSR may complete the process of moving the data packet through the service chain within its region and on to the destination VPC.

Thus, since all CSRs in various regions and/or zones advertise the same anycast IP, for example, service A, even if a local instance of service A goes down, a CSR may forward a data packet to a remote instance of service A in another region/zone via the CSR in the region/zone.

In order to provide service node load balancing and redundancy, multiple instances of the services may be instantiated in the service nodes. For example, the service A VPC may include multiple instances that may provide service A. If one of the instances fails, the other instances may provide service A. Additionally, in order to provide load balancing within the service A VPC, the CSR may route the data packet to particular service A instance.

In configurations, auto scaling may be provided by adding a new instance in any of the service VPCs. A route (tunnel) for the new instance from the CSR in the infra VPC may be created. Also, the BGP weight may be controlled to prefer one instance or another instance in a remote location (e.g., different region) so that traffic may be load balanced accordingly. BGP weight may cater to the health or the load of a particular instance of a service node.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1A schematically illustrates a multi-cloud fabric 100 that includes two public cloud networks 102a and 102b (collectively referred to as public cloud networks 102). The public cloud networks 102a, 102b include two regions 104a, 104b, and 104c, 104d, respectively, (collectively referred to as regions 104). The public cloud networks 102 may include more or fewer regions 104. Each region 104 includes VPCs/VNets 106 that may be configured as user VPCs/VNets or service VPCs/VNets. For simplicity, the VPCs/VNets 106 are referred to collectively herein as VPCs 106. The multi-cloud fabric 100 also includes an on-premises network 108. In configurations, the public cloud networks 102a, 102b, the regions 104a, 104b, 104c, 104d, and/or on-premises network 108 may be considered sub-networks.

The multi-cloud fabric 100 also includes a multi-site controller 110 (e.g., a multi-site application policy infrastructure controller (APIC)) that communicates with cloud controllers 112a, 112b in the public cloud networks 102a, 102b (e.g., cloud APICs), as well as a controller in the on-premises network 108. The multi-site controller 112 may work with the controllers to manage and implement policies and configurations on both the public cloud networks 102a, 102b and the on-premises network 108. The multi-site controller 112 can implement, such as by translating, a same policy model in the public cloud networks 102a, 102b, and the on-premises network 108, which can be based on a particular SDN or datacenter solution such as Cisco's ACI. For example, the multi-site controller 112 can implement VRFs, end-points (EPs), end-point groups (EPGs) and associated policies in the public cloud networks 106a, 106b, as well as the on-premises network 108.

In configurations, data packet traffic (referred to herein as "traffic") may be routed between the VPCs 106 through tunnels 114 running between user VPCs 106a-106h (e.g., source VPCs and destination VPCs) and infra VPCs 116a-116d (collectively referred to as infra VPCs 116) that include CSRs 118a-118d (collectively referred to as CSRs 118). Similarly, traffic may be routed between service VPCs 106i-106p and infra VPCs 116a-116d to provide service chains. Traffic between any two networks (cloud-to-cloud 102a-102b or cloud-to-on-premises 102a, 102b-108) may also be routed via tunnels 120a-120c. Additionally, in configurations, traffic may be routed from one infra VPC 116 (or infra VNET) to another infra VPC 116 (or infra VNET) via tunnels 120a-120c. For example, internet protocol security (IPSec)/generic routing encapsulation (GRE) tunnels may span between two CSR instances 118 across regions 104. The CSRs 118a-118d include route tables 122a-122d, respectively, as will be discussed further herein.

Figure 1B:
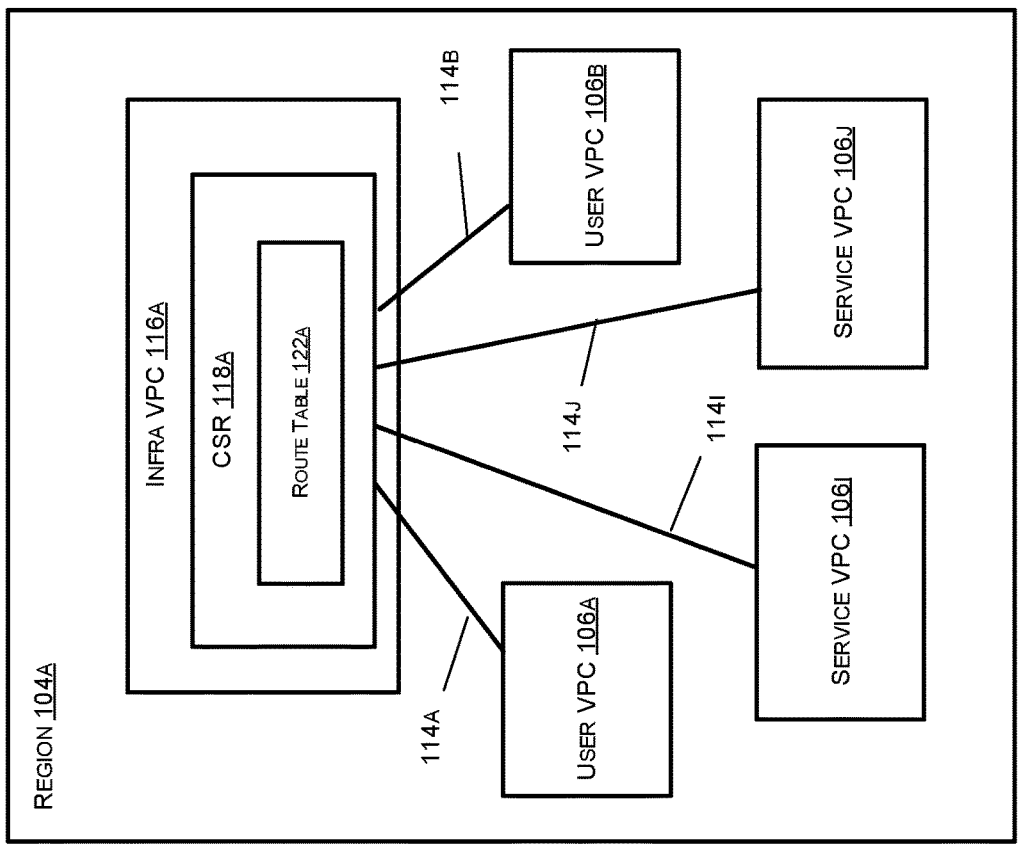

FIG. 1B schematically illustrates region 104a on a larger scale. As previously noted, different tunnels are provided within each CSR (cloud router) to represent different legs/combinations (e.g., segments) of the service chain. In particular, tunnel 114a couples infra VPC 116a and CSR 118a with user VPC 106a, tunnel 114b couples infra VPC 116a and CSR 118a with user VPC 106b, tunnel 114i couples infra VPC 116a and CSR 118a with service VPC 106i, and tunnel 114j couples infra VPC 116a and CSR 118a with service VPC 106j.

Thus, based on the ingress tunnel interface of a data packet in the CSR 118a, the previous node (e.g., service VPC 106i) traversed in the service chain may be inferred and therefore, the data packet may be guided toward the next service node (e.g., service VPC 106j) in the service chain. Thus, the same data packet may traverse through the CSR 118a multiple times. Each time the data packet may be forwarded to a different service node in the service chain without changing any part of the original data packet (e.g., source IP address and destination IP address).

For example, assume a service chain includes service VPC 106i, which performs service A in the service chain, and service VPC 106j, which performs service B in the service chain. Tunnels 114a, 114b, 114i, and 114j are created in the CSR 118a for each of the VPCs 106a, 106b, 106i, and 106j. For example, tunnel 114a between the user VPC 106a (which may be the source for a data packet) and the CSR 118a (thus no previous service in the service chain). Tunnel 114i may extend between service VPC 106i and the CSR 118a, e.g., the previous service is service A. Tunnel 114j may extend between service VPC 106j and the CSR 118a, e.g., the previous service is service B. Tunnel 114b may extend between the CSR 118a and user VPC 106b (which may be the destination for the data packet), e.g., no further services are to be performed before delivery to the destination VPC. Each of the tunnels 114a, 114b, 114i, and 114j may be in different VRFs so that a current leg may be identified as a segment (or VRF) in the CSR 118a. This may help in customizing a forwarding look-up table, e.g., route table 122, for the same pair of source and destination IP addresses of data packets (e.g., source IP address and destination IP address combinations) that is hopping through the CSR 118*a* to get to different services without any changes to data packet address information. Alternatively, all tunnels 114 in the CSR 118*a* may belong to the same VRF, but policy-based routing (PBR) rules may be different based on (tunnel, source, destination) combinations. As is known, PBR is a technique used to make routing decisions based on policies set by the network administrator. In a particular, when a router receives a packet, the router normally decides where to forward the packet based on the destination address in the packet, which is then used to look up an entry in a routing table. However, in some cases, there may be a need to forward the packet based on other criteria. For example, a network administrator might want to forward a packet based on the source address, not the destination address. This permits routing of packets originating from different sources to different networks even when the destinations are the same and can be useful when interconnecting several private networks. PBR may also be based on the size of the packet, the protocol of the payload, or other information available in a packet header or payload.

Thus, a route table 122*a* may be defined at the CSR 118*a* that provides rules for data packets from first user VPC (source) 106*a* IP address and second user VPC (destination) 106*b* IP address combinations. For example, based on the source VPC 106*a* and the destination VPC 106*b* IP address combination, the CSR 118*a* knows to route data packets from VPC 106*a* destined for VPC 106*b* through a service chain that includes service VPC 106*i* and service VPC 106*j* enroute to the destination VPC. While only two service VPCs 106*i*, 106*j* are illustrated, any number of service VPCs 106 may be included in the service chain.

Thus, for example, based on the source VPC 106*a* and destination VPC 106*b* combination, a data packet received by the CSR 118*a* via tunnel 114*a* from the source VPC 106*a* may be routed to the service VPC 106*i* using tunnel 114*i*. After the service A is performed, the data packet may be routed back to the CSR 118*a* via tunnel 114*i*. Since the CSR 118*a* receives the data packet via tunnel 114*i*, based on the route table 122, e.g., the source VPC 106*a* and the destination VPC 106*b* combination in the route table 122, the CSR 118*a* routes the data packet on tunnel 114*j* to the service VPC 106*j*. After service B is performed, the data packet is routed back to the CSR 118*a* via tunnel 114*j*. Based on the route table 122, the CSR 118*a* knows to now route the data packet via tunnel four to the destination user VPC 106*b* via tunnel 114*b* since no services are left to be performed.

Figure 1C:
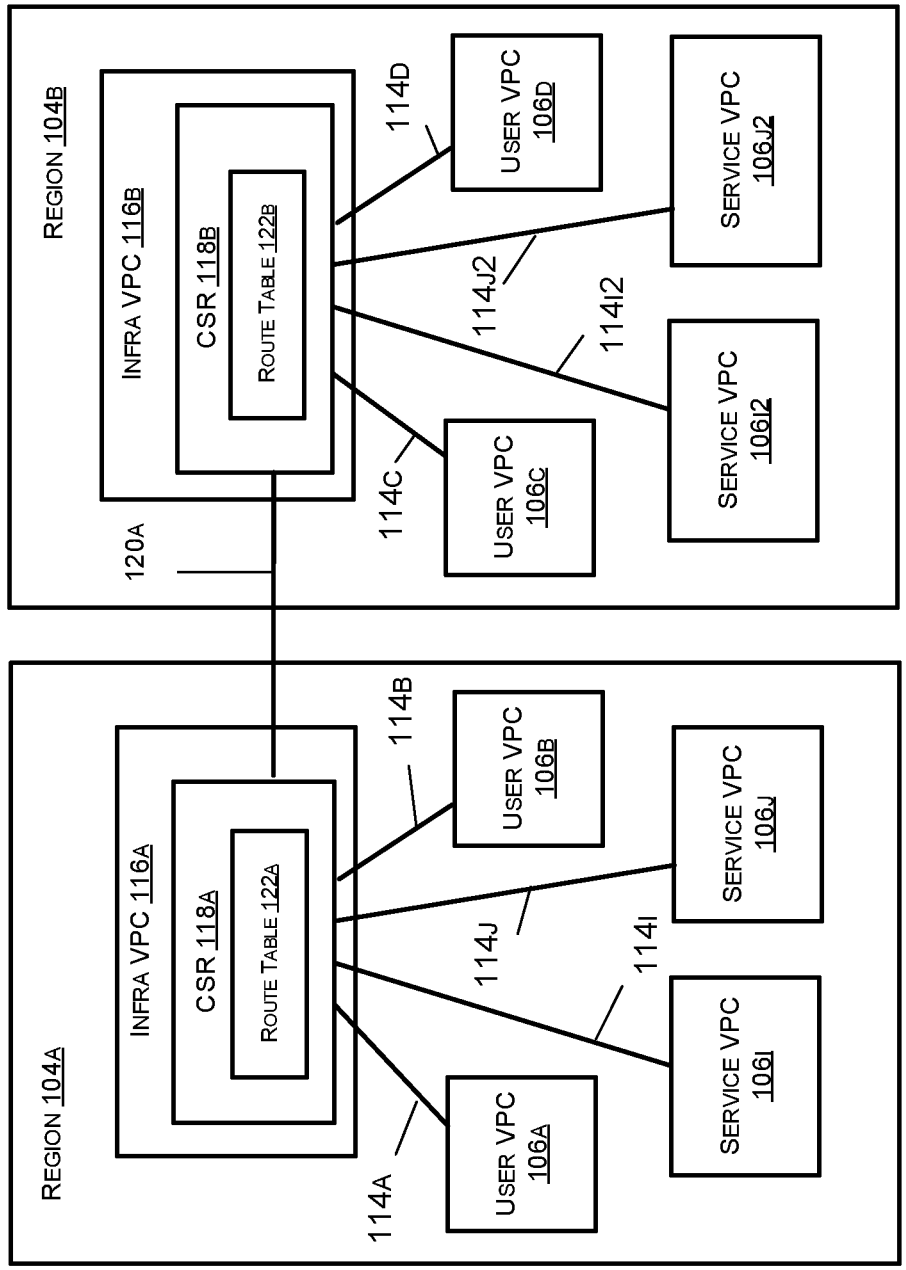

Referring to FIG. 1C, in configurations, multiple regions 104*a*, 104*b* of the public cloud network 102*a* and/or multiple regions 104*c*, 104*d* of public cloud network 102*b* may each have some or all of the same service VPCs, e.g., services VPC 106*i*, 106*j* that provide services A and B, respectively. Service VPCs 106*a*, 106*j* may also include multiple instances that provide services A and B, respectively. In configurations, the service VPCs 106*i* of the regions 104*a*-104*d* may carry the same anycast IP address A and the service VPCs 106*j*, of the regions 104*a*-104*d* may carry the same anycast IP address B. The CSRs 118 of the regions may advertise the anycast IP addresses to other CSRs 118 and other regions 104 through BGP.

As an example, the anycast IP address A of the service VPC 106*i* may be broadcast by the CRS 118 and is the PBR rule destination. When multiple CSRs 118 advertise the anycast IP address A in the regions 104 of the public cloud networks 102*a*, 102*b*, in configurations the service VPC 106*i* that is closest to the CSR, e.g., CSR 118*a*, receiving the broadcast may be chosen. Generally, if the service VPC 106*i* of the same region 104*a* of the CSR 118*a* receiving the broadcast is functioning, then that service VPC 106*i* is chosen, e.g., the locally attached VPC 106*i* in the same zone/region 104*a* of the receiving CSR 118*a*. However, if the service VPC 106*i* has failed or is overloaded, the anycast IP address A of a service VPC 106*i* of an adjacent region (or adjacent zone), e.g., region 104*b* may automatically be chosen.

Thus, referring to FIG. 1C, the data packet may be routed via a tunnel 120*a* from CSR 118*a* (the receiving CSR) to the CSR 118*b* of the region 104*b* (CSR of the adjacent region). The CSR 118*b* may then route the data packet along the appropriate tunnel, e.g., tunnel 114*i*2 in the corresponding region 104*b* to the service VPC 106*i*2. When the service A is completed, the data packet may be routed back to the CSR 118*b*, which may forward the data packet back to the CSR 118*a*. The CSR 118*a* may then continue moving the data packet through the service chain, e.g., to service VPC 106*j*1 as previously described, and on to the destination user VPC 106*b*. In configurations, the CSR 118*b* may complete the process of moving the data packet through the service chain within its region, e.g., service VPC 106*j*2 of region 104*b*, as previously described, and then back to CSR 118*a*, which forwards the data packet on to the destination VPC 106*b* of region 104*a*.

Thus, since all CSRs 118 in various regions 104 advertise the same anycast IP addresses, for example, IP service address A, even if a local instance of the service VPC 106*i* that provides service A goes down, a CSR may forward a data packet to a remote service VPC that provides service A in another region/zone via the CSR in that region/zone.

In order to provide service VPC 106 load balancing and redundancy, multiple instances of the services may be instantiated in the service VPCs 106. For example, the service VPC 106*i* may include multiple instances that may provide service A. If one of the instances fails, the other instances may provide service A. Additionally, in order to provide load balancing within the service VPC 106*i*, the CSR 118*a* may route the data packet to a particular service A instance in the VPC 106*i*. The cloud controllers 112 may manage the load balancing among instances within service VPCs. In configurations, auto scaling may be provided by instantiating a new instance of service in any of the service VPCs 106 by the cloud controllers 112. A route (tunnel) for the new instance from the CSR 118 in the corresponding infra VPC 114 may be created by the cloud controllers 112. Also, a BGP weight may be controlled by the cloud controllers 112 to prefer one instance or another instance in a service VPC 106 so that traffic may be load balanced accordingly. For example, if a first instance in VPC 106*i* in region 104*a* is over-loaded, the BGP weight may be adjusted by the cloud controller 112*a* in order to make BGP prefer a second instance that is not as loaded. BGP weight may cater to the health or the load of a particular instance within a service VPC 106.

Additionally, the cloud controllers 112 may load balance among service VPCs 106 across regions 104 and/or networks 102. For example, if the local service VPC 106*i* in region 104*a* is over-loaded, the BGP weight may be adjusted by the cloud controller 112*a* in order to make BGP prefer a remote service VPC 106*i* in another region, e.g., region 104*b*, that is not as loaded.

Figure 2:
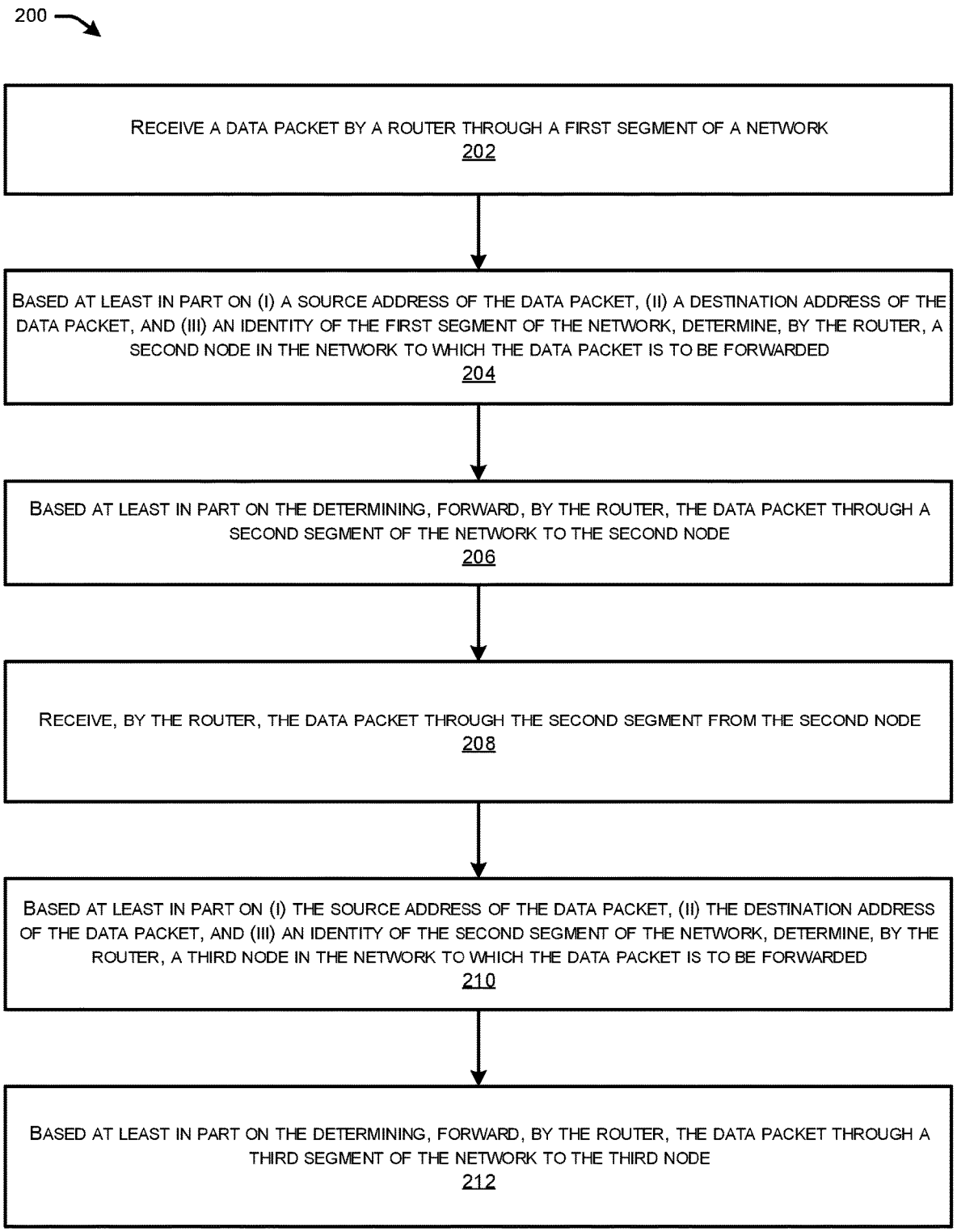
FIG. 2 illustrates a flow diagram of an example method for routing data packets through service chains within public cloud networks of the multi-cloud fabric of FIGS. 1A-1C.

FIG. 2 illustrates a flow diagram of an example method 200 and illustrates aspects of the functions performed at least partly by one or more devices in the multi-cloud fabric 100 as described in FIGS. 1A-1C. The logical operations described herein with respect to FIG. 2 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 2 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 2 illustrates a flow diagram of an example method 200 for routing data packets through service chains within public cloud networks of multi-cloud fabrics. In some examples, the method 200 may be performed by a system comprising one or more processors and one or more non-transitory computer-readable media storing computer-executable instructions that, when executed by the one or more processors, cause the one or more processors to perform the method 200.

At 202, a router in a network receives a data packet through a first segment of the network. At 204, based at least in part on (i) a source address of the data packet, (ii) a destination address of the data packet, and (iii) an identity of the first segment of the network, the router determines a second node in the network to which the data packet is to be forwarded. At 206, based at least in part on the determining, the router forwards the data packet through a second segment of the network to the second node.

At 208, the router receives the data packet through the second segment from the second node. At 210, based at least in part on (i) the source address of the data packet, (ii) the destination address of the data packet, and (iii) an identity of the second segment of the network, the router determines a third node in the network to which the data packet is to be forwarded. At 212, based at least in part on the determining, the router forwards the data packet through a third segment of the network to the third node.

Figure 3:
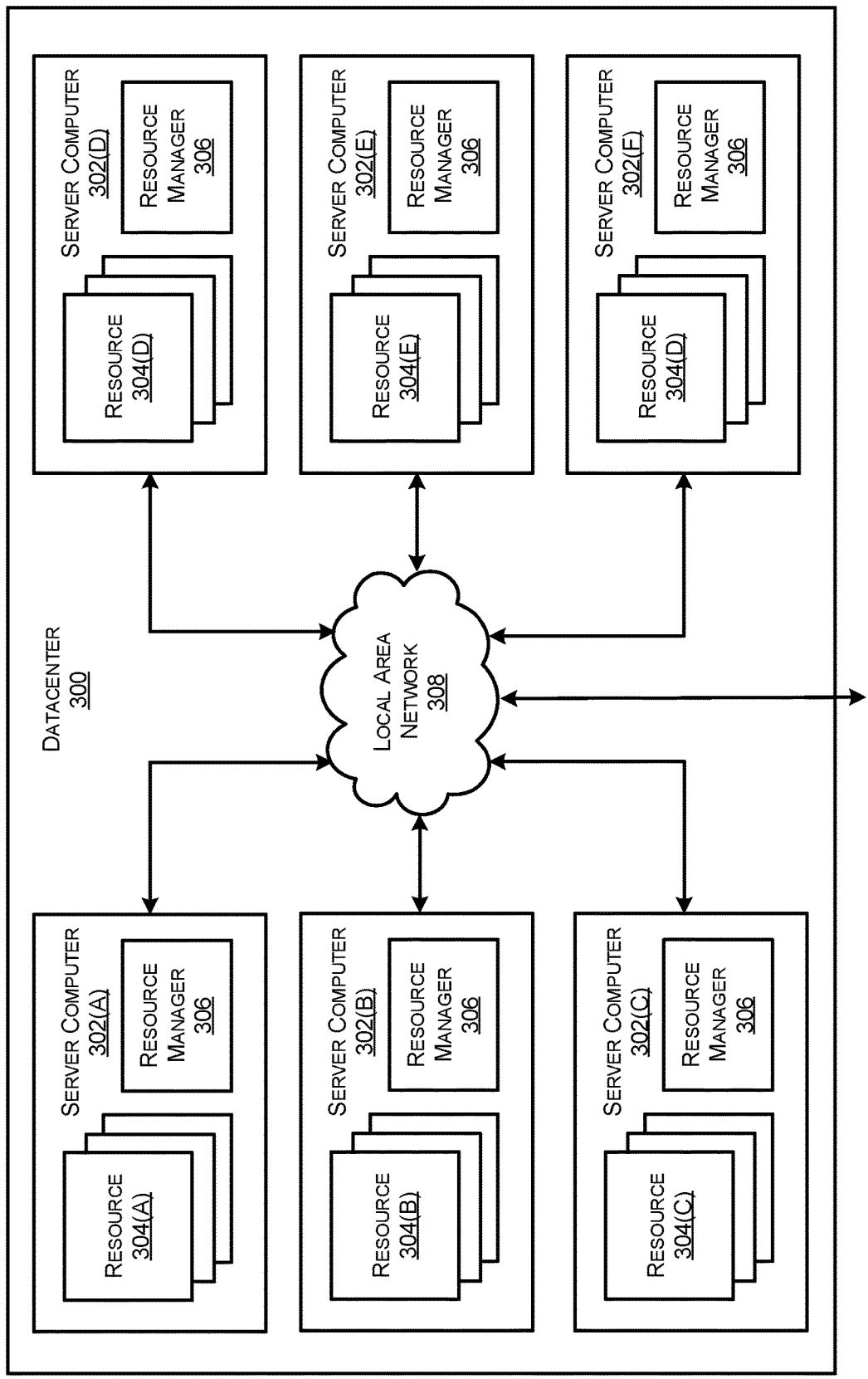
FIG. 3 illustrates a computing system diagram illustrating a configuration for a datacenter that can be utilized to implement aspects of the technologies disclosed herein.

FIG. 3 is a computing system diagram illustrating a configuration for a datacenter 300 that can be utilized to implement aspects of the technologies disclosed herein. The example datacenter 300 shown in FIG. 3 includes several server computers 302A-302F (which might be referred to herein singularly as "a server computer 302" or in the plural as "the server computers 302") for providing computing resources. In some examples, the resources and/or server computers 302 may include, or correspond to, the VPCs 106 described herein.

The server computers 302 can be standard tower, rackmount, or blade server computers configured appropriately for providing the computing resources described herein. As mentioned above, the computing resources provided by the cloud computing networks 102a and 102b can be data processing resources such as VM instances or hardware computing systems, database clusters, computing clusters, storage clusters, data storage resources, database resources, networking resources, and others. Some of the servers 302 can also be configured to execute a resource manager capable of instantiating and/or managing the computing resources. In the case of VM instances, for example, the resource manager can be a hypervisor or another type of program configured to enable the execution of multiple VM instances on a single server computer 302. Server computers 302 in the datacenter 300 can also be configured to provide network services and other types of services.

In the example datacenter 300 shown in FIG. 3, an appropriate LAN 308 is also utilized to interconnect the server computers 302A-302F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between datacenters 300, between each of the server computers 302A-302F in each datacenter 300, and, potentially, between computing resources in each of the server computers 302. It should be appreciated that the configuration of the datacenter 300 described with reference to FIG. 3 is merely illustrative and that other implementations can be utilized.

In some examples, the server computers 302 may each execute one or more virtual resources that support a service or application provisioned across a set or cluster of servers 302. The virtual resources on each server computer 302 may support a single application or service, or multiple applications or services (for one or more users).

In some instances, the cloud computing networks 102a and 102b may provide computing resources, like application containers, VM instances, and storage, on a permanent or an as-needed basis. Among other types of functionality, the computing resources provided by cloud computing networks may be utilized to implement the various services described above. The computing resources provided by the cloud computing networks can include various types of computing resources, such as data processing resources like application containers and VM instances, data storage resources, networking resources, data communication resources, network services, and the like.

Each type of computing resource provided by the cloud computing networks can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing networks can also be configured to provide other types of computing resources not mentioned specifically herein.

The computing resources provided by the cloud computing networks may be enabled in one embodiment by one or more datacenters 300 (which might be referred to herein singularly as "a datacenter 300" or in the plural as "the datacenters 300"). The datacenters 300 are facilities utilized to house and operate computer systems and associated components. The datacenters 300 typically include redundant and backup power, communications, cooling, and security systems. The datacenters 300 can also be located in geographically disparate locations. One illustrative embodiment for a server computer 302 that can be utilized to implement the technologies disclosed herein will be described below with regard to FIG. 4.

Figure 4:
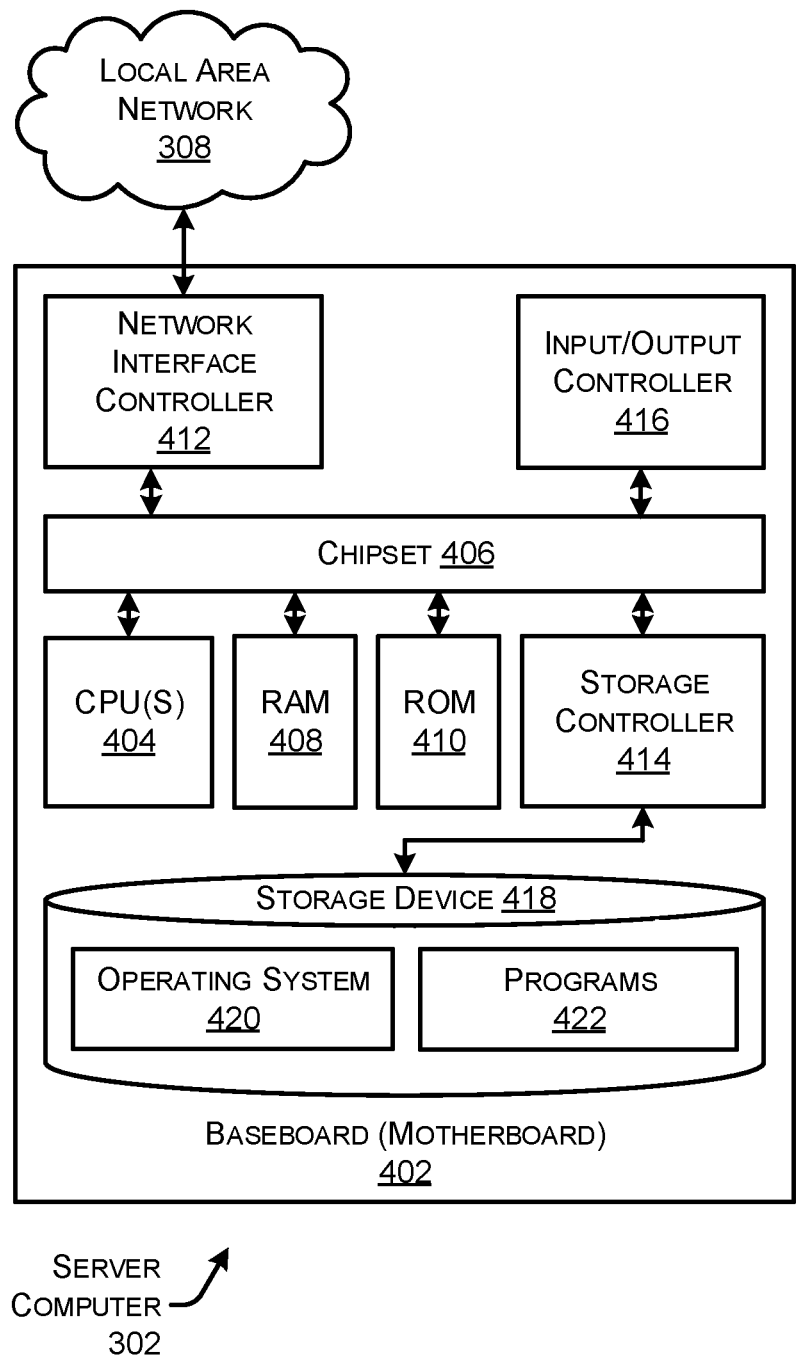
FIG. 4 is a computer architecture diagram showing an illustrative computer hardware architecture for implementing a server device that can be utilized to implement aspects of the various technologies presented herein.

FIG. 4 shows an example computer architecture for a server computer 302 capable of executing program components for implementing the functionality described above. The computer architecture shown in FIG. 4 illustrates a conventional server computer, workstation, desktop computer, laptop, tablet, network appliance, e-reader, smartphone, or other computing device, and can be utilized to execute any of the software components presented herein. The server computer 302 may, in some examples, correspond to physical devices or resources described herein.

The server computer 302 includes a baseboard 402, or "motherboard," which is a printed circuit board to which a multitude of components or devices can be connected by way of a system bus or other electrical communication paths. In one illustrative configuration, one or more central processing units ("CPUs") 404 operate in conjunction with a chipset 406. The CPUs 404 can be standard programmable processors that perform arithmetic and logical operations necessary for the operation of the server computer 302.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 406 provides an interface between the CPUs 404 and the remainder of the components and devices on the baseboard 402. The chipset 406 can provide an interface to a RAM 408, used as the main memory in the server computer 302. The chipset 406 can further provide an interface to a computer-readable storage medium such as a read-only memory ("ROM") 410 or non-volatile RAM ("NVRAM") for storing basic routines that help to startup the server computer 302 and to transfer information between the various components and devices. The ROM 410 or NVRAM can also store other software components necessary for the operation of the server computer 302 in accordance with the configurations described herein.

The server computer 302 can operate in a networked environment using logical connections to remote computing devices and computer systems through a network, such as the network 308. The chipset 406 can include functionality for providing network connectivity through a NIC 412, such as a gigabit Ethernet adapter. The NIC 412 is capable of connecting the server computer 302 to other computing devices over the network 308. It should be appreciated that multiple NICs 412 can be present in the server computer 302, connecting the computer to other types of networks and remote computer systems.

The server computer 302 can be connected to a storage device 418 that provides non-volatile storage for the computer. The storage device 418 can store an operating system 420, programs 422, and data, which have been described in greater detail herein. The storage device 418 can be connected to the server computer 302 through a storage controller 414 connected to the chipset 406. The storage device 418 can consist of one or more physical storage units. The storage controller 414 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The server computer 302 can store data on the storage device 418 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 418 is characterized as primary or secondary storage, and the like.

For example, the server computer 302 can store information to the storage device 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server computer 302 can further read information from the storage device 418 by detecting the physical states or characteristics of one or more particular locations within the physical storage units.

In addition to the mass storage device 418 described above, the server computer 302 can have access to other computer-readable storage media to store and retrieve information, such as program modules, data structures, or other data. It should be appreciated by those skilled in the art that computer-readable storage media is any available media that provides for the non-transitory storage of data and that can be accessed by the server computer 302. In some examples, the operations performed by the cloud computing network, and or any components included therein, may be supported by one or more devices similar to server computer 302. Stated otherwise, some or all of the operations performed by the cloud computing networks 102a and 102b, and or any components included therein, may be performed by one or more server computers 302 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 418 can store an operating system 420 utilized to control the operation of the server computer 302. According to one embodiment, the operating system comprises the LINUX operating system. According to another embodiment, the operating system comprises the WINDOWS® SERVER operating system from MICROSOFT Corporation of Redmond, Wash.

According to further embodiments, the operating system can comprise the UNIX operating system or one of its variants. It should be appreciated that other operating systems can also be utilized. The storage device 418 can store other system or application programs and data utilized by the server computer 302.

In one embodiment, the storage device 418 or other computer-readable storage media is encoded with computer-executable instructions which, when loaded into the server computer 302, transform the computer from a general-purpose computing system into a special-purpose computer capable of implementing the embodiments described herein. These computer-executable instructions transform the server computer 302 by specifying how the CPUs 404 transition between states, as described above. According to one embodiment, the server computer 302 has access to computer-readable storage media storing computer-executable instructions which, when executed by the server computer 302, perform the various processes described above with regard to FIGS. 1A, 1B, 1C, and 2. The server computer 302 can also include computer-readable storage media having instructions stored thereupon for performing any of the other computer-implemented operations described herein.

The server computer 302 can also include one or more input/output controllers 416 for receiving and processing input from a number of input devices, such as a keyboard, a mouse, a touchpad, a touch screen, an electronic stylus, or other type of input device. Similarly, an input/output controller 416 can provide output to a display, such as a computer monitor, a flat-panel display, a digital projector, a printer, or other type of output device. It will be appreciated that the server computer 302 might not include all of the components shown in FIG. 4, can include other components that are not explicitly shown in FIG. 4, or might utilize an architecture completely different than that shown in FIG. 4.

The server computer 302 may support a virtualization layer, such as one or more virtual resources executing on the server computer 302. In some examples, the virtualization layer may be supported by a hypervisor that provides one or more virtual machines running on the server computer 302 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
    receiving, at a router in a network and through a first tunnel of the network, a data packet from a first node in the network;
    based at least in part on (i) a source address of the data packet, (ii) a destination address of the data packet, and (iii) an identity of the first tunnel of the network, determining, by the router, a second node in the network to which the data packet is to be forwarded;
    based at least in part on the determining, forwarding, by the router through a second tunnel of the network, the data packet to the second node;
    receiving, at the router through the second tunnel, the data packet from the second node;
    based at least in part on (i) the source address of the data packet, (ii) the destination address of the data packet, and (iii) an identity of the second tunnel of the network, determining, by the router, a third node in the network to which the data packet is to be forwarded; and
    based at least in part on the determining, forwarding, by the router through a third tunnel of the network, the data packet to the third node.

2. The method of claim 1, wherein the second node comprises multiple instances of a service and the method further comprises determining to which instance of the multiple instances the data packet is to be forwarded.

3. The method of claim 2, wherein determining to which instance of the multiple instances the data packet is to be forwarded is based on balancing loads of the multiple instances.

4. The method of claim 2, wherein determining to which instance of the multiple instances the data packet is to be forwarded is based on is based on a first instance of the service failing and determining to which instance of the multiple instances the data packet is to be forwarded comprises determining to forward the data packet to a second instance of the service based on the first instance of the service failing.

5. The method of claim 1, wherein the second node comprises a service and the method further comprises:
    determining that a first instance of the service has exceeded a load threshold; and
    generating a second instance of the service at the second node.

6. The method of claim 1, wherein determining the second node in the network to which the data packet is to be forwarded comprises determining the second node in the network using a route map.

7. The method of claim 1, wherein the network comprises multiple sub-networks, the router is a first router and part of a first sub-network, and the method further comprises:
    receiving, at the first router through the second tunnel, the data packet from the second node;
    based at least in part on (i) the source address of the data packet, (ii) the destination address of the data packet, and (iii) the identity of the second tunnel of the network, determining, by the first router, a third node in the network to which the data packet is to be forwarded, the third node comprising a service;
    receiving, by the first router from one or more routers in one or more sub-networks of the multiple sub-networks, an anycast IP address for other nodes in the one or more sub-networks that comprise the service;
    selecting, by the router, a fourth node in a second sub-network of the one or more sub-networks, the fourth node comprising the service;
    forwarding, by the first router to a second router in the second sub-network, the data packet through a third tunnel of the network;
    forwarding, by the second router through a fourth tunnel of the second sub-network, the data packet to the fourth node;
    receiving, at the second router from the fourth node through the fourth tunnel, the data packet;

determining, by the second router, a next destination to which the data packet is to be forwarded; and forwarding, by the second router, the data packet to the next destination.

8. The method of claim 7, wherein determining, by the second router, a next destination to which the data packet is to be forwarded comprises determining the next destination is the first router.

9. The method of claim 7, wherein determining, by the second router, a next destination to which the data packet is to be forwarded comprises determining the next destination is a fifth node in the second sub-network.

10. A system comprising:
one or more processors; and
one or more non-transitory computer-readable media storing computer-executable instructions that, when executed by the one or more processors, cause the one or more processors to perform actions comprising:
receiving, at a router in a network and through a first tunnel of the network, a data packet from a first node in the network;
based at least in part on (i) a source address of the data packet, (ii) a destination address of the data packet, and (iii) an identity of the first tunnel of the network, determining, by the router, a second node in the network to which the data packet is to be forwarded;
based at least in part on the determining, forwarding, by the router through a second tunnel of the network, the data packet to the second node;
receiving, at the router through the second tunnel, the data packet from the second node;
based at least in part on (i) the source address of the data packet, (ii) the destination address of the data packet, and (iii) an identity of the second tunnel of the network, determining, by the router, a third node in the network to which the data packet is to be forwarded; and
based at least in part on the determining, forwarding, by the router through a third tunnel of the network, the data packet to the third node.

11. The system of claim 10, wherein the second node comprises multiple instances of a service and the actions further comprise determining to which instance of the multiple instances the data packet is to be forwarded.

12. The system of claim 11, wherein determining to which instance of the multiple instances the data packet is to be forwarded is based on balancing loads of the multiple instances.

13. The system of claim 11, wherein determining to which instance of the multiple instances the data packet is to be forwarded is based on is based on a first instance of the service failing and determining to which instance of the multiple instances the data packet is to be forwarded comprises determining to forward the data packet to a second instance of the service based on the first instance of the service failing.

14. The system of claim 10, wherein the second node comprises a service and the actions further comprise:
determining that a first instance of the service has exceeded a load threshold; and
generating a second instance of the service at the second node.

15. The system of claim 10, wherein determining the second node in the network to which the data packet is to be forwarded comprises determining the second node in the network using a route map.

16. The system of claim 10, wherein the network comprises multiple sub-networks, the router is a first router and part of a first sub-network, and the actions further comprise:
receiving, at the first router through the second tunnel, the data packet from the second node;
based at least in part on (i) the source address of the data packet, (ii) the destination address of the data packet, and (iii) the identity of the second tunnel of the network, determining, by the first router, a third node in the network to which the data packet is to be forwarded, the third node comprising a service;
receiving, by the first router from one or more routers in one or more sub-networks of the multiple sub-networks, an anycast IP address for other nodes in the one or more sub-networks that comprise the service;
selecting, by the router, a fourth node in a second sub-network of the one or more sub-networks, the fourth node comprising the service;
forwarding, by the first router to a second router in the second sub-network, the data packet through a third tunnel of the network;
forwarding, by the second router through a fourth tunnel in the second sub-network, the data packet to the fourth node;
receiving, at the second router from the fourth node through the fourth tunnel, the data packet;
determining, by the second router, a next destination to which the data packet is to be forwarded; and
forwarding, by the second router, the data packet to the next destination.

17. The system of claim 16, wherein determining, by the second router, a next destination to which the data packet is to be forwarded comprises determining the next destination is the first router.

18. The system of claim 16, wherein determining, by the second router, a next destination to which the data packet is to be forwarded comprises determining the next destination is a fifth node in the second sub-network.

19. One or more non-transitory computer-readable media storing computer-executable instructions that, when executed by one or more processors, cause the one or more processors to perform actions comprising:
receiving, at a router in a network through a first tunnel of the network, a data packet from a first node in the network;
based at least in part on (i) a source address of the data packet, (ii) a destination address of the data packet, and (iii) an identity of the first tunnel of the network, determining, by the router, a second node in the network to which the data packet is to be forwarded;
based at least in part on the determining, forwarding, by the router through a second tunnel of the network, the data packet to the second node;
receiving, at the router through the second tunnel, the data packet from the second node;
based at least in part on (i) the source address of the data packet, (ii) the destination address of the data packet, and (iii) an identity of the second tunnel of the network, determining, by the router, a third node in the network to which the data packet is to be forwarded; and
based at least in part on the determining, forwarding, by the router through a third tunnel of the network, the data packet to the third node.

20. The one or more non-transitory computer-readable media of claim 19, wherein the network comprises multiple sub-networks, the router is a first router and part of a first sub-network, and the actions further comprise:

receiving, at the first router through the second tunnel, the data packet from the second node;

based at least in part on (i) the source address of the data packet, (ii) the destination address of the data packet, and (iii) the identity of the second tunnel of the network, determining, by the first router, a third node in the network to which the data packet is to be forwarded, the third node comprising a service;

receiving, by the first router from one or more routers of one or more sub-networks of the multiple sub-networks, an anycast IP address for other nodes in the one or more sub-networks that comprise the service;

selecting, by the router, a fourth node in a second sub-network of the one or more sub-networks, the fourth node comprising the service;

forwarding, by the first router to a second router in the second sub-network, the data packet through a third tunnel of the network;

forwarding, by the second router through a fourth tunnel of the second sub-network to the fourth node;

receiving, at the second router from the fourth node through the fourth tunnel, the data packet;

determining, by the second router, a next destination to which the data packet is to be forwarded; and forwarding, by the second router, the data packet to the next destination.

* * * * *